United States Patent [19]

Baechler et al.

[11] Patent Number: 5,188,389
[45] Date of Patent: Feb. 23, 1993

[54] FOLDABLE BABY STROLLER AND AXLE ASSEMBLY THEREFOR

[75] Inventors: Philip A. Baechler, Yakima; Timothy O. Armstrong, Issaquah, both of Wash.

[73] Assignee: Racing Strollers Inc., Yakima, Wash.

[21] Appl. No.: 862,981

[22] Filed: Apr. 6, 1992

[51] Int. Cl.⁵ .............................................. B62B 7/06
[52] U.S. Cl. ..................... 280/650; 280/62; 301/111; 301/121; 301/125
[58] Field of Search ............. 280/62, 650, 658, 47.38; 301/111, 121, 125

[56] References Cited

U.S. PATENT DOCUMENTS

| | | | |
|---|---|---|---|
| 3,870,371 | 3/1975 | Solomon | 301/1 |
| 4,570,956 | 2/1986 | Dyer | 280/30 |
| 4,847,945 | 7/1989 | Schwartz et al. | 16/30 |
| 4,917,442 | 4/1990 | Johnson | 301/113 |
| 4,958,842 | 9/1990 | Chang | 280/7.1 |
| 4,963,115 | 10/1990 | Davin et al. | 446/96 |
| 5,029,891 | 7/1991 | Jacobs | 280/62 |
| 5,123,670 | 6/1992 | Chen | 280/62 |

Primary Examiner—David M. Mitchell
Attorney, Agent, or Firm—Seed and Berry

[57] ABSTRACT

An all-terrain baby stroller using an axle assembly that permits the stroller frame to be collapsible. The axle assembly has a coupler at each end of a tubular axle. Each coupler assembly employs two coupler members, one connected to an upright frame member and the tubular axle, and the other one connected to a horizontal frame member. The couplers are rotatably connected to each other by a hub member. A portion of one coupler rotatably fits within the other coupler, and the hub member extends coaxially through both couplers and allows the one coupler to rotate about it. A stub axle carrying one of the rear wheels is removably received within the hub member. A locking pin is inserted into a hole formed through the stub axle, hub member, an inward one of the couplers, and the tubular axle to releasably retain the stub axle in place. A pair of upper frame members is pivotally connected to the upright frame members and removably connected to the horizontal frame members to permit folding of the frame.

28 Claims, 3 Drawing Sheets

FOLDABLE BABY STROLLER AND AXLE ASSEMBLY THEREFOR

TECHNICAL FIELD

The present invention relates to baby strollers, and more particularly, to all-terrain baby strollers that can be collapsed and their wheels removed.

BACKGROUND OF THE INVENTION

Traditionally, baby strollers have been used to push an infant slowly on a relatively hard, smooth floor or sidewalk. As a result, the strollers were made small and light. These strollers work well enough at slow speed, but are extremely unwieldy and even dangerous on rough surfaces or at higher speeds.

As parents have become more health conscious in recent times, jogging and fast walking has become a popular pastime. Because baby strollers were not designed to be operated at high speed or on rough terrain, parents could jog or fast walk only when another person was available to babysit. As any parent knows, it is not always easy to find babysitters, so the ability of the parent to stay in shape by jogging or fast walking was severely limited.

Even for non-jogging parents, the need for an improved baby stroller has been apparent. The small, plastic wheels customarily used for the baby strollers are almost useless when it is desired to walk with an infant in a grassy park or on a rough road or sidewalk. Parents end up not walking with the infant at all or only walking in limited areas.

Recently, all-terrain baby strollers have been designed to overcome these problems. These strollers typically employ much larger wheels, often large bicycle tires. The stroller frame and frame connections are constructed to be stronger and larger to handle the heavy duty use they may receive. It is now quite common to see a parent pushing an infant while jogging, fast walking or even just slow walking in grassy, bumpy areas or over other rough terrain.

These new strollers have their drawbacks. The increased size and durable construction make the stroller much larger and heavier than in the past, and as a result much more difficult to transport, especially as car sizes have decreased. Not everyone has access to large vehicles or to tools to take the stroller apart for transport. Even if tools were available, it is not practical or convenient to take the time needed to dismantle the stroller each time it is to be transported. Further, the larger size of all-terrain strollers makes their storage difficult.

The present invention solves these problems by providing a quick, easy way to collapse an all-terrain or other style stroller for transport and storage and to remove its wheels.

SUMMARY OF THE INVENTION

The present invention resides in a portable baby stroller and an axle assembly therefor. The axle assembly functions in conjunction with a frame stroller frame having first and second frame members and a rear wheel mounted on a wheel-supporting axle to permit the stroller frame to fold. The axle assembly includes a tubular rear axle having a first end portion, a first coupler and a second coupler. The first coupler has first and second end portions and a first support connector, with the first end portion being received within the first end portion of the tubular axle and held against rotation relative to the tubular axle. The first support connector is fixedly attached to the first frame member. The second coupler has first and second end portions and a second support connector, with the first end portion being positioned adjacent to the second end portion of the first coupler for rotation of the first and second couplers relative to each other about a common axis. The second support connector is fixedly attached to the second frame member. The axle assembly further includes a connector member rotatably holding the second coupler in position adjacent to the first coupler, and receiving the wheel-supporting axle. In a preferred embodiment, the wheel-supporting axle is a stub axle and the connector member releasably receives the stub axle to allow selective removal of the stub axle.

The connector member is a hub member extending coaxially through the first and second couplers, and having a central aperture extending interior of the first and second couplers to receive the wheel-supporting axle therein. The hub connector is held against rotation relative to the first connector, and the second coupler is rotatably disposed on the hub member. The hub member has an elongated portion extending coaxially fully through the second coupler and at least partially through the first coupler. The elongated portion has inward and outward ends, the inward end being fixedly attached to the first coupler to prevent rotation or outward movement of hub member relative to the first coupler. The outward end has a stop member to prevent outward movement of the second coupler away from the first coupler.

The first coupler, the hub member and the stub axle each have a hole which aligns when the stub axle is within the hub member central aperture. The holes are sized to receive a removable lock pin. The hub member central aperture and the stub axle have mating non-circular cross-sectional shapes with sizes to prevent rotation of the stub axle within the hub member central aperture. The axle assembly includes a releasable member, such as the removable lock pin, releasably holding the stub axle within the hub member central aperture.

In the illustrated embodiment, the first coupler has an inner body portion with a central aperture, and a first end portion of the inner body portion has a plurality of radially projecting ribs sized to fit snugly within the first end portion of the tubular axle. A second end portion of the inner body portion has an outward body portion extending thereabout and defining an end recess. The first end portion of the second coupler is rotatably received within the outward body portion end recess.

The first support connector has a receiver aperture sized to receive therein the first frame member, and the second support connector has a receiver aperture sized to receive therein the second frame member. The receiver apertures of the first and second connectors extend transversely to the common axis of the first and second couplers.

A foldable baby stroller utilizing the above-described axle assembly includes a forward wheel, and left and right rearward wheels. The stroller has downwardly sloping left and right upper frame members supporting a baby seat therebetween. The upper frame members each have a lower end and an upper end. A handle member is connected to and extends between the left and right upper frame members toward the upper ends of the upper frame members. The stroller has left and right horizontal base frame members, each having a forward end and a rearward end. The forward wheel is removably attached to the base frame members toward the forward ends thereof. The lower ends of the upper frame members are releasably connected to the base frame member at a position toward the forward wheel. The baby stroller further includes left and right generally upright frame members, each having a lower end and an upper end. The upper ends of the upright frame members are pivotally connected to the upper frame members at a position between the handle and the lower end of the upper frame members.

The stroller also includes a tubular rear axle having left and right ends with an interior opening. Left and right first couplers are provided, with each first coupler having an inward end portion positioned within the end opening of a corresponding one of the left or right ends of the rear axle. The inward end portion is held therein stationary relative to the rear axle. Left and right second couplers are provided, each second coupler having an inward end portion positioned adjacent to an outward end portion of a corresponding one of the left and right first couplers. The second couplers are rotatable relative to the first couplers. Left and right connector members are also provided. Each connector member holds a corresponding one of the left and right second couplers in position adjacent to the corresponding one of the left and right first couplers while permitting rotation of the first couplers relative to the second couplers. Each of the connector members rotatably supports a corresponding one of the left or right rear wheels. In the illustrated embodiment of the invention, left and right stub axles are provided, each having a corresponding one of the left and right rear wheels rotatably mounted on an outward end thereof. An inward end of the stub axle is removably received within an aperture in a corresponding one of the left and right connector members.

Other features and advantages of the invention will become apparent from the following detailed description, taken in conjunction with the accompanying drawings.

DETAILED DESCRIPTION OF THE INVENTION

Figure 1:
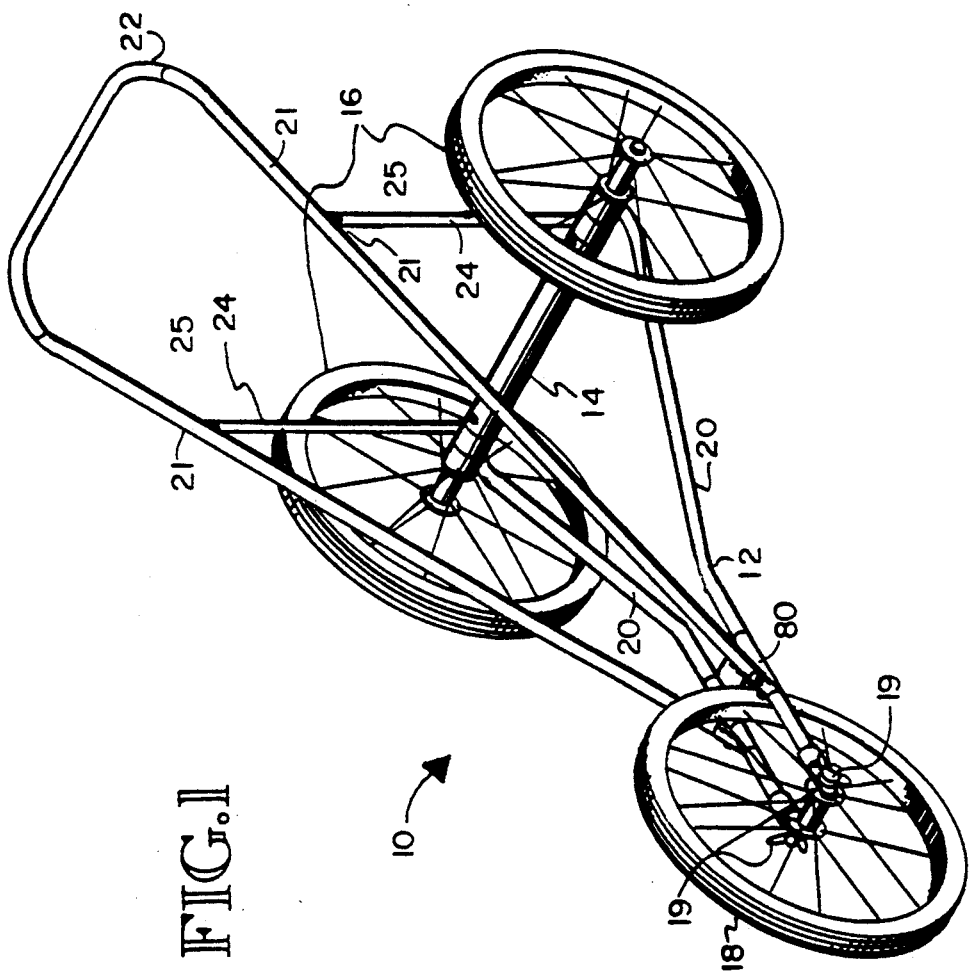
FIG. 1 is an isometric view of a baby stroller embodying the present invention shown in an upright position for use, but without a seat being shown.

As shown in the drawings for purposes of illustration, the present invention is embodied in an all-terrain baby stroller 10 having a foldable frame 12 and a rear axle assembly 14 designed to permit folding of the frame and removal of the two rear wheels 16 rotatably mounted to the rear axle assembly. The forward end of the frame 12 has a single front wheel 18 rotatably mounted thereto and detachable with conventional wing nuts 19. The frame 12 includes left and right side horizontal base frame tubes 20 extending rearwardly from the front wheel 18 in parallel configuration and then angling outward to the rear axle assembly 14. The frame 12 also includes left and right, downwardly sloping upper frame tubes 21 which extend from a handle 22 in converging configuration to the horizontal base frame tubes 20 at a position near the rearwardmost extent of the front wheel 18. The handle 22 is positioned at a height convenient for a user to push the stroller 10. The frame 12 further includes left and right upright support tubes 24 extending between the rear axle assembly 14 and the upper frame tubes 20 at a position below the handle 22. The upright support tubes 24 are pivotally connected to the upper frame tubes 21 by left and right pivot joints 25.

Figures 2, 3:
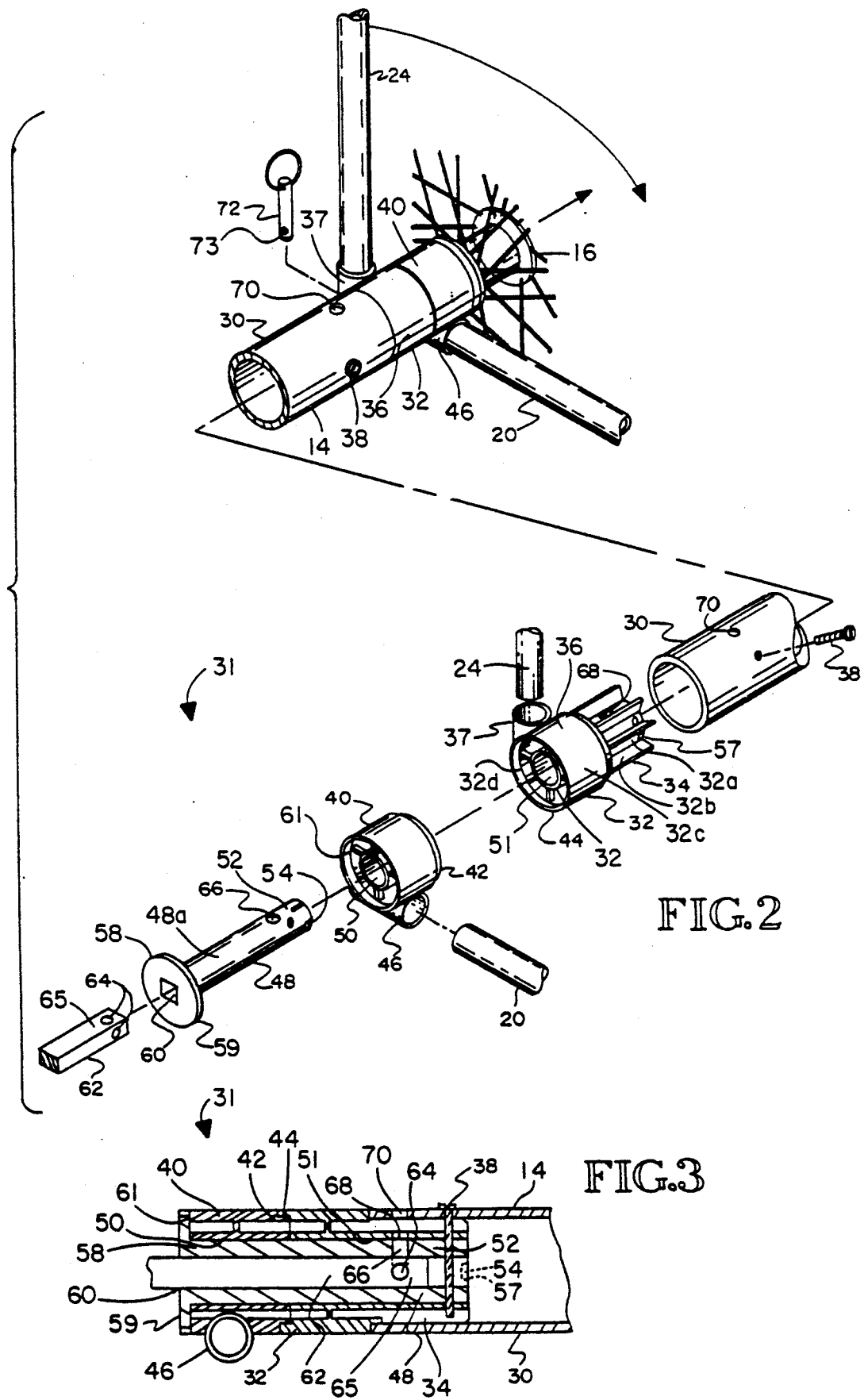
FIG. 2 is an enlarged, fragmentary view of the axle assembly of FIG. 1 with the right side axle assembly shown exploded and the left side axle assembly shown assembled, except for the insertion of a lock pin.
FIG. 3 is a cross-sectional, fragmentary, enlarged side view of the right side the axle assembly of FIG. 2 shown assembled.

As best shown in FIGS. 2 and 3, the rear axle assembly 14 uses a two-inch tubular axle 30 with a coupler assembly 31 attached to each of the left and right ends of the axle. The right side coupler assembly 31 is shown in exploded fashion in FIG. 2. Each coupler assembly includes a first coupler 32 with a ribbed portion 34 sized to be snugly inserted into a corresponding open end of the tubular axle 30. The first coupler has a connector portion 36 with a tube receiver portion 37 within which a corresponding one of the left or right upright support tubes 24 is inserted and fixed in place using a pair of rivets (not shown). A screw 38 extends through the tubular axle 30 and is screwed into and grasps the ribbed portion 34 of the first coupler 32 to hold the first coupler in place against removal and to prevent its rotation relative to the tubular axle. The first coupler 32 is rigidly connected to the tubular axle 30 in a position so that when the stroller 10 is in the unfolded position shown in FIG. 1 ready for use, the tube receiver portion 37 holds the upright support tube 24 therein in a substantially vertical position.

Figure 5:
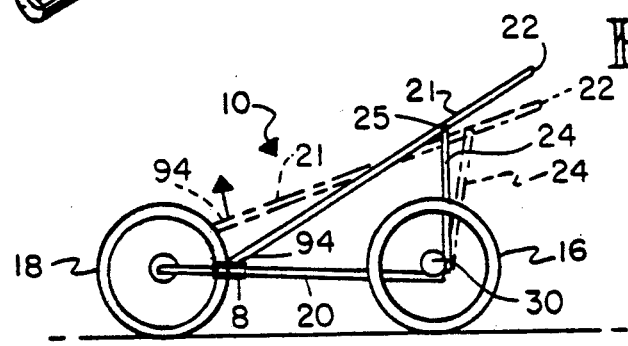
FIG. 5 is a reduced scale, left side view of the stroller of FIG. 1 as it is being collapsed for transport.
Figure 6:
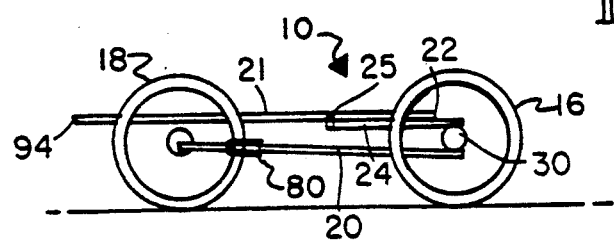
FIG. 6 is a left side view of the stroller of FIG. 5 shown fully folded but before the wheels are removed.

The coupler assembly 31 also includes a second coupler 40 which has a reduced diameter circular inward end portion 42 which extends within a corresponding circular outward end recess 44 of the first coupler 32 at its outward end and is rotatably received therein to allow the first coupler (and hence the tubular axle 30 fixedly attached thereto by the screw 38) to rotate relative to the said coupler. As with the first coupler 32, the second coupler 40 has a tube receiver portion 46 within which a corresponding one of the left or right horizontal base frame tubes 20 is inserted and fixed in place using a rivet (not shown). With this arrangement, the second coupler 40, which holds one of the horizontal base frame tubes 20, and the first coupler 32, which holds one of the upright support tubes 24, can be freely rotated relative to each other by a sufficient amount to allow the folding of the upright support tubes downward relative to the horizontal base frame tubes for folding of the stroller 10 as illustrated in FIGS. 5 and 6.

The coupler assembly 31 further includes a hub member 48 having a smooth walled cylindrical shaft portion 48 which extends through a longitudinal smooth-bore central aperture 50 of the second coupler 40 and a longitudinal smooth-bore central aperture 51 of the first coupler 32. The first coupler 32, the second coupler 40 and the hub member 48 are in coaxial alignment. The shaft portion 48a has an outer diameter sized to provide a snug fit within the central apertures 50 and 51 to help eliminate wobble between the hub member 48, the first coupler 32 and the second coupler 40. An inward end portion 52 of the hub member 48 has a pair of ears 54 which engage a pair of notches 57 on the inward end of the first coupler 32, and thereby lock the hub member in place against outward movement. An outward end 58 of the hub member 48 has a head portion 59 sized larger than the central aperture 50 of the second coupler 40 to prevent outward movement of the second coupler 40 away from the first coupler 32, and thereby hold the coupler assembly 31 together while still permitting rotation of the first coupler relative to the second coupler. The head portion 59 has a diameter sufficiently large to fit snugly and rotatably within a recess 61 at the outward end of the second coupler 40. The smooth walled shaft portion 48a of the hub member 48, which is positioned within the central aperture 50 of the second coupler 40, also serves as a coupler axle which rotates relative to the second coupler as the stroller frame 12 is folded for compact transport or storage and unfolded for use of the stroller 10. As such, the hub member 48 acts to hold the second coupler 40 in place against the first coupler 32 while permitting its free rotation of the first coupler relative to the second coupler.

In the illustrated embodiment of the invention, the first coupler 32 has an elongated cylindrical inner sleeve portion 32a defining the central aperture 51 and to which a plurality of radially projecting ribs 32b are attached along an inward end portion. An outer cylindrical body portion 32c is attached along an outward end portion of the inner sleeve portion 32a. The outer body portion 32c defines the recess 44 and has an interior stop shoulder 32d which the end portion 42 of the second coupler 40 slidably engages when within the recess 44 to allow relative rotation between the first and second couplers 32 and 40.

Further, the second coupler 40 has an elongated cylindrical inner sleeve portion 40a defining the central aperture 50 and to which an outer cylindrical body portion 40b is attached. The outer body portion 40b defines the recess 61 and has an interior stop shoulder 40c which the inward face of the head portion 59 of the hub member 48 slidably engages when within the the recess 61 to allow relative rotation between the second coupler 40 and the hub member.

The hub member 48 has a central aperture 60 with a square cross-section which extends fully therethrough to snugly receive therein a stub axle 62 also having a matching square cross-section. One of the stroller rear wheels 16 is rotatably mounted on an outward end of the stub axle 62. The similar shape of the stub axle 62 and the central aperture 60 of the hub member 48, which may be almost any mating non-circular shape, prevents the stub axle 62 from rotating within the central aperture 60. As best shown in FIG. 3 for the right side, when the coupler assembly 31 is assembled with the hub member 48 in place and extending through the second coupler 40 and the first coupler 32, the screw 38 not only holds the first coupler in place within the tubular axle 30, but it also passes through the inward end portion 52 of the hub member to hold it in place against rotation relative to the first coupler and thus the tubular axle. The stub axle 62 has a length which extends nearly the full length of the hub member 48, but not so far as to engage the screw 38.

To provide for removability of the stub axle 62 and the rear wheel 16 mounted thereto, cross holes 64 are drilled through an inward end portion 65 of the stub axle. Aligned holes 66, 68 and 70 are drilled through the hub member 48, the first coupler 32 and the tubular axle 30, respectively, in alignment with a corresponding one of the holes 64 in the stub axle 62 and have the same diameter as the holes 64. The holes are sized to receive a removable lock pin 72 with a detent ball 73 snugly therein, shown in FIG. 2, when the stub axle 62 is fully inserted within the central aperture 60 of the hub member 48. The lock pin 72 securely holds the stub axle 62 in position within the hub member 48 against removal therefrom or rotation relative to the hub member, the first coupler 32 and the tubular axle 30. The stub axle 62, the hub member 48, the first coupler 32 and the tubular axle 30, however, remain free to rotate relative to the second coupler 40, thus allowing the upright support tubes 24 to be folded downward for transport or storage when desired.

When it is desired to remove the rear wheel 16, the lock pin 72 need simply be removed and the stub axle 62 pulled out of the hub member 48 for detachment of the rear wheel from the frame 12 for more compact transport or storage. It is noted that with the axle assembly 14 of the present invention, the frame 12 can be folded with or without removal of the stub axle 62 and the rear wheel 16 it carries. As mentioned above, the holes 64 in the end portion 65 of the stub axle 62 are cross-drilled so that the stub axle can be inserted into the hub member 48 without concern for its orientation and still have one of the two cross-drilled holes 64 aligned to receive the lock pin 72.

Figure 4:
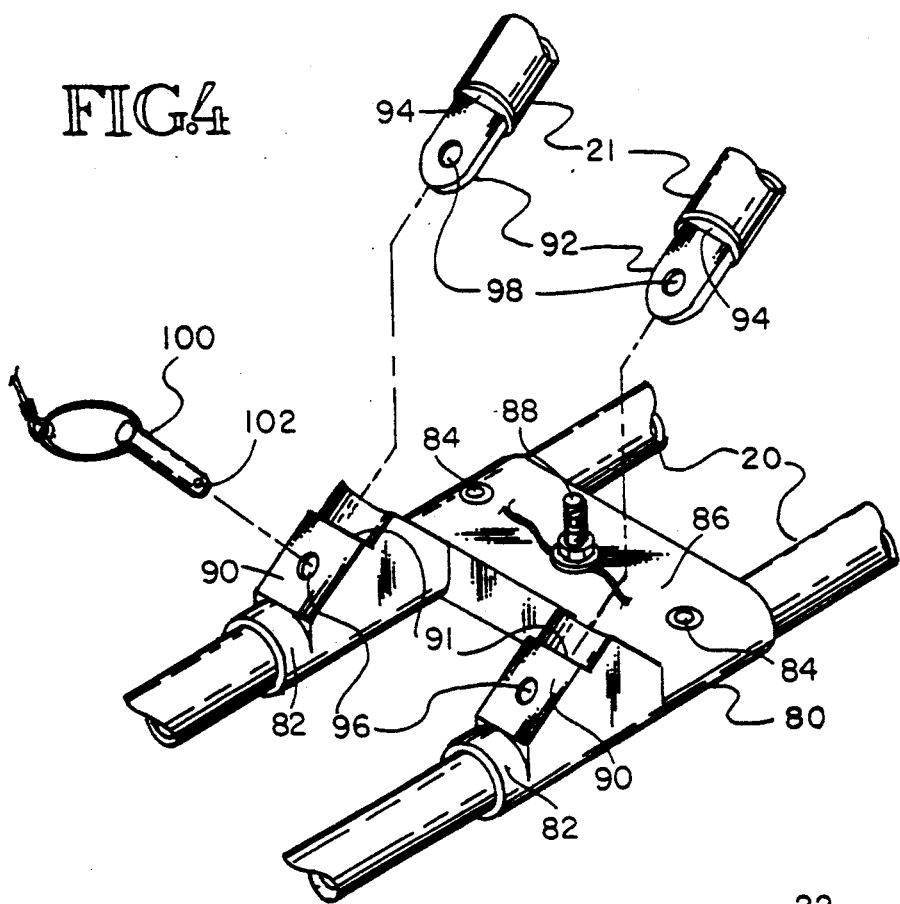
FIG. 4 is an enlarged, fragmentary, isometric view of a front frame connector used for the stroller of FIG. 1.

As shown in FIG. 4, the upper frame tubes 21 are releasably coupled to the horizontal base frame tubes 20 by a frame connector 80 affixed to both of the horizontal base frame tubes. The frame connector 80 has left and right tube receiver portions 82 through which the horizontal base frame tubes 20 extend. The frame connector is fixed in place on the horizontal base frame tubes 20 at a position near the rearwardmost extent of the front wheel 18 using rivets 84. A bridge portion 86 of the frame connector 80 extends between the left and right tube receiver portions 82 to rigidly hold the two horizontal base frame tubes 20 in a fixed spaced-apart relation and also provide a platform to which a front wheel caliper brake (not shown) is attached therebelow by a bolt 88.

The frame connector 80 has left and right connector portions 90, each positioned above a forward end portion of a corresponding one of the left and right tube receiver portions 82. Each connector portion 90 has a slot 91 therein sized to removably receive a tongue portion 92 of a fitting 94 positioned within and fixedly attached to a lower terminal end of a corresponding one of the upper frame tubes 21. The tongue portion 92 is sized to fit snugly within a corresponding one of the connector slots 91. An aperture 96 is formed in each connector portion 90 and a corresponding aperture 98 is formed in each tongue portion 92 of the fittings 94 so that the apertures 96 and 98 will be in alignment when the tongue portion is inserted within the connector portion. The apertures 96 and 98 are sized to receive a removable lock pin 100 with a detent ball 102 snugly therein to securely hold the tongue portion 92 within the corresponding connector portion 90, and thereby rigidly attach the upper frame tubes 21 to the horizontal base frame tubes 20. When desired for folding of the frame 12 for compact transport or storage, the two lock pins 100 need simply be removed and the tongue portions 92 pulled out of the connector slots 91 for detachment of the lower terminal end of the upper frame tubes 21 from the horizontal base frame tubes 20.

As best seen in FIGS. 5 and 6, the stroller 10 can be folded for easy transport or storage by removing lock pins 100 so as to allow the tongue portions 92 to be slid out of the connector slots 91 which, as shown in phantom line in FIG. 5, requires that the upright support tubes 24 first be rotated slightly rearward. Once the lower terminal ends of the upper frame tubes 21 are free of the frame connector 80, the upper frame tubes 21 can be pivoted relative to the upright support tubes 24 at the pivot joints 25 and the freed lower terminal ends of the upper frame tubes moved forward to the position shown in FIG. 6. This rotates the upright support tubes 24 relative to the horizontal base frame tubes 20 by rotation of the first couplers 32 and the tubular axle 30 relative to the second couplers 40, which allows the frame 12 to be folded with the upper frame tubes 21 and the upright support tubes 24 in substantially parallel arrangement with the horizontal base frame tubes 20, as shown in FIG. 6. The rear and front wheels 16 and 18 may then be removed to compact the stroller 10 even further and reduce the weight which must be lifted with the stroller frame 12.

It will be appreciated that, although a specific embodiment of the invention has been described herein for purposes of illustration, various modifications may be made without departing from the spirit and scope of the invention. Accordingly, the invention is not limited except as by the appended claims.

We claim:

1. An axle assembly for a foldable baby stroller having first and second frame members and a rear wheel mounted on a stub axle, comprising:
a tubular rear axle having a first end portion;
a first coupler having first and second end portions and a first support connector, with the first end portion being received within the first end portion of the tubular axle and held against rotation relative to the tubular axle, and the first support connector being fixedly attached to the first frame member;
a second coupler having first and second end portions and a second support connector, with the first end portion being rotatably mated to the second end portion of the first coupler for rotation of the first coupler relative to the second coupler about a common axis, and the second support connector being fixedly attached to the second frame member; and
a connector member holding the second coupler in position adjacent to the first coupler, and releasably receiving the stub axle to allow selective removal of the stub axle and rear wheel.

2. The axle assembly of claim 1, wherein the connector member is a hub member extending coaxially through the first and second couplers, and having a central aperture extending interior of the first and second couplers to releasably receive the stub axle therein, the hub member being held against rotation relative to the first coupler and the second coupler being rotatably disposed on the hub member.

3. The axle assembly of claim 2, wherein the hub member has an elongated portion extending coaxially fully through the second coupler and at least partially through the first coupler, the elongated portion having inward and outward ends, the inward end being fixedly attached to the first coupler to prevent rotation or outward movement of the hub member relative to the first coupler, and the outward end having a stop member to prevent outward movement of the second coupler away from the first coupler.

4. The axle assembly of claim 3, wherein the elongated portion of the hub member has an elongated central aperture coaxial with the common axis of the first and second couplers, and sized to receive therein the stub axle, the elongated portion having a smooth exterior cylindrical surface portion and the second coupler having a central aperture with a smooth cylindrical surface portion, the smooth surface portion of the elongated portion being positioned within the smooth surface portion of the second coupler central aperture to permit free rotation of the second coupler relative to the hub member.

5. The axle assembly of claim 2, wherein the first coupler, the hub member, and the stub axle each have a hole in alignment when the stub axle is within the hub member central aperture, the holes being sized to receive a removable lock pin.

6. The axle assembly of claim 2, wherein the hub member central aperture and the stub axle have mating non-circular cross-sectional shape with sizes to prevent rotation of the stub axle within the hub member central aperture.

7. The axle assembly of claim 6 further including a releasable member releasably holding the stub axle within the hub central member aperture.

8. The axle assembly of claim 1, wherein the first coupler has an inner body portion with a central aperture, and a first end portion of the inner body portion has a plurality of radially projecting ribs sized to fit snugly within the first end portion of the tubular axle.

9. The axle assembly of claim 8, wherein a second end portion of the inner body portion has an outward body portion extending thereabout and defining an end recess, and the first end portion of the second coupler is rotatably received within the outward body portion and recess.

10. The axle assembly of claim 1, wherein the first support connector has a receiver aperture sized to receive therein the first frame member, and the second support connector has a receiver aperture sized to receive therein the second frame member.

11. The axle assembly of claim 10, wherein the receiver apertures of the first and second support connectors extend transverse to the common axis of the first and second couplers.

12. The axle assembly of claim 1, wherein the second end portion of the first coupler has a cylindrical wall portion and the first end portion of the second coupler has a cylindrical wall portion, one of the first or second coupler wall portions being sized to rotatably fit within the wall portion of the other.

13. A foldable baby stroller comprising:
a forward wheel;
left and right rearward wheels;
left and right stub axles, each having an inward end portion and an outward end portion, with a corresponding one of the left or right rearward wheels rotatably mounted on the outward end portion;
downwardly sloping left and right upper frame members supporting a baby seat therebetween, the upper frame members each having a lower end and an upper end;
a handle member connected to and extending between the left and right upper frame members toward the upper ends of the upper frame members;

left and right horizontal base frame members, each having a forward end and a rearward end, the forward wheel being removably attached to the base frame members toward the forward end thereof, the lower ends of the upper frame members being releasably connected to the base frame members at a position toward the forward wheel;

left and right generally upright frame members, each having a lower end and an upper end, the upper end of the upright frame members being pivotally connected to the upper frame members at a position between the handle and the lower end of the upper frame members;

a tubular rear axle having left and right ends with an interior opening therein;

left and right first couplers, each first coupler having an inward end portion positioned within the end opening of a corresponding one of the left or right ends of the rear axle and held therein stationary relative to the rear axle, and an outward end portion, each first coupler further having a frame member connector portion to which a corresponding one of the left or right upright frame members is connected;

left and right second couplers, each second coupler having an inward end portion positioned adjacent to the outward end portion of a corresponding one of the left or right first couplers, and being rotatable relative thereto, each second coupler further having a frame member connector portion to which a corresponding one of the left or right base frame members is connected; and left and right connector members, each connector member holding a corresponding one of the left or right second couplers in position adjacent to the corresponding one of the left or right first couplers while permitting rotation of the second couplers relative to the first couplers, each connector member having an aperture therein to removably receive a corresponding one of the left or right stub axles therein.

14. The stroller of claim 13, wherein each connector member is a hub member extending coaxially through a corresponding pair of the first and second couplers, and having a central aperture extending interior of the first and second couplers to releasably receive a corresponding one of the left and right stub axles therein, the hub member being held against rotation relative to the first coupler and the second coupler being rotatably disposed on the hub member.

15. The stroller of claim 14, wherein the hub member has an elongated portion extending coaxially fully through the second coupler and at least partially through the first coupler, the elongated portion having inward and outward ends, the inward end being fixedly attached to the first coupler to prevent rotation or outward movement of the hub member relative to the first coupler, and the outward end having a stop member to prevent outward movement of the second coupler away from the first coupler.

16. The stroller of claim 15, wherein the elongated portion of the hub member has an elongated central aperture coaxial with the common axis of the first and second couplers, and sized to receive therein the stub axle, the elongated portion having a smooth exterior cylindrical surface portion and the second coupler having a central aperture with a smooth cylindrical surface portion, the smooth surface portion of the elongated portion being positioned within the smooth surface portion of the second coupler central aperture to permit free rotation of the second coupler relative to the hub member.

17. The stroller of claim 14, wherein the first coupler, the hub member, and the stub axle each have a hole in alignment when the stub axle is within the hub member central aperture, the holes being sized to receive a removable lock pin.

18. The stroller of claim 14, wherein the hub member central aperture and the stub axle have mating non-circular cross-sectional shapes with sizes to prevent rotation of the stub axle within the hub member central aperture.

19. The stroller of claim 18 further including a releasable member releasably holding the stub axle within the hub member central aperture.

20. The stroller of claim 13, wherein each first coupler has an inner body portion with a central aperture, and a first end portion of the inner body portion has a plurality of radially projecting ribs sized to fit snugly within a corresponding left or right end of the tubular axles.

21. The stroller of claim 20, wherein a second end portion of the inner body portion has an outward body portion extending thereabout and defining an end recess, and the first end portion of the second coupler is rotatably received within the outward body portion and recess.

22. The stroller of claim 13, wherein the first coupler frame member connector portion has a receiver aperture sized to receive therein a corresponding one of the left or right upright frame members, and the second coupler frame member connector portion has a receiver aperture sized to receive therein a corresponding one of the left or right base frame members.

23. The stroller of claim 22, wherein the receiver apertures of the first and second coupler frame member conNector portions extend transverse to the common axis of the first and second couplers.

24. The stroller of claim 13, wherein the outward end portion of each of the left and right first couplers has a cylindrical wall portion and the inward end portion of each of the left and right second coupler has a cylindrical wall portion, one of the first or second coupler wall portions for corresponding pairs of the left and right first and second couplers being sized to rotatably fit within the wall portion of the other.

25. An axle assembly for a foldable baby stroller having first and second frame members and a rear wheel mounted on a wheel-supporting axle, comprising:

a tubular rear axle having a first end portion;

a first coupler having first and second end portions and a first support connector, with the first end portion being received within the first end portion of the tubular axle and held against rotation relative to the tubular axle, and the first support connector being fixedly attached to the first frame member;

a second coupler having first and second end portions and a second support connector, with the first end portion being positioned adjacent to the second end portion of the first coupler for rotation of the first and second couplers relative to each other about a common axis, and the second support connector being fixedly attached to the second frame member; and a connector member rotatably holding the second coupler in position adjacent to the first coupler, and receiving the wheel-supporting axle.

26. The axle assembly of claim 25, wherein the connector member is a hub member extending coaxially through the first and second couplers, and having a central aperture extending interior of the first and second couplers to receive the wheel-supporting axle therein, the hub member being held against rotation relative to the first coupler and the second coupler being rotatably disposed on the hub member.

27. The axle assembly of claim 26, wherein the hub member has an elongated portion extending coaxially fully through the second coupler and at least partially through the first coupler, the elongated portion having inward and outward ends, the inward end being fixedly attached to the first coupler to prevent rotation or outward movement of the hub member relative to the first coupler, and the outward end having a stop member to prevent outward movement of the second coupler away from the first coupler.

28. A foldable baby stroller, comprising:
a forward wheel;
left and right rearward wheels;
downwardly sloping left and right upper frame members supporting a baby seat therebetween, the upper frame members each having a lower end and an upper end;
a handle member connected to and extending between the left and right upper frame members toward the upper ends of the upper frame members;
left and right horizontal base frame members, each having a forward end and a rearward end, the forward wheel being removably attached to the base frame members toward the forward end thereof, the lower ends of the upper frame members being releasably connected to the base frame members at a position toward the forward wheel;
left and right generally upright frame members, each having a lower end and an upper end, the upper end of the upright frame members being pivotally connected to the upper frame members at a position between the handle and the lower end of the upper frame members;
a tubular rear axle having left and right ends with an interior opening therein;
left and right first couplers, each first coupler having an inward end portion positioned within the end opening of a corresponding one of the left or right ends of the rear axle and held therein stationary relative to the rear axle, and an outward end portion, each first coupler further having a frame member connector portion to which a corresponding one of the left or right upright frame members is connected;
left and right second couplers, each second coupler having an inward end portion positioned adjacent to the outward end portion of a corresponding one of the left or right first couplers, and being rotatable relative thereto, each second coupler further having a frame member connector portion to which a corresponding one of the left or right base frame members is connected; and
left and right connector members, each connector member holding a corresponding one of the left or right second couplers in position adjacent to the corresponding one of the left or right first couplers while permitting rotation of the second couplers relative to the first couplers, each connector member rotatably supporting a corresponding one of the left or right rear wheels.

* * * * *